United States Patent [19]

Takayama et al.

[11] E Patent Number: Re. 33,022

[45] Reissued Date of Patent: Aug. 15, 1989

[54] FERROMAGNETIC AMORPHOUS ALLOY

[75] Inventors: Shinji Takayama, Tokyo; Yasuo Tsukuda, Ome; Kazuo Shiiki, Kanagawa; Shigekazu Otomo, Hachioji; Mitsuhiro Kudo, Hamuramachi; Yasunobu Ogata, Kumagaya; Yoshizo Sawada, Saitama, all of Japan

[73] Assignees: Hitachi, Ltd.; Hitachi Metals, Ltd.; Research Development Corp. of Japan, all of Tokyo, Japan

[21] Appl. No.: 116,883

[22] Filed: Nov. 5, 1987

Related U.S. Patent Documents

Reissue of:

[64] Patent No.: 4,306,908
Issued: Dec. 22, 1981
Appl. No.: 188,746
Filed: Sep. 19, 1980

[30] Foreign Application Priority Data

Sep. 21, 1979 [JP] Japan ..... 54-121655

[51] Int. Cl.[4] ..... H01F 1/04

[52] U.S. Cl. ..... 148/304; 148/310; 148/311; 148/313; 148/403; 420/104; 420/105; 420/125; 420/126; 420/435; 420/436; 420/440; 420/581

[58] Field of Search ..... 148/304, 310, 311, 312, 148/313, 315, 403; 420/435, 436, 440, 441, 442, 452, 453, 454

[56] References Cited

U.S. PATENT DOCUMENTS

| | | | |
|---|---|---|---|
| 3,986,867 | 10/1976 | Matsumoto et al. | 148/403 |
| 4,187,128 | 2/1980 | Billings | 148/121 |
| 4,496,635 | 1/1985 | Wang et al. | 428/680 |

FOREIGN PATENT DOCUMENTS

| | | |
|---|---|---|
| 49-74246 | 7/1974 | Japan . |
| 54-29817 | 3/1979 | Japan . |

OTHER PUBLICATIONS

Ray et al., "Electron Diffraction Study of a Noncrystalline Zr-Ni Phase", Metallurgical Transactions vol. 4, Aug. 1973, pp. 1785-1790.

Ray et al., "New Non-Crystalline Phase in Split Cool Transition Metal Alloys" Scripts Metallurgica, vol. 2, pp. 357-359, Apr. 29, 1968, Pergamon Press.

*Primary Examiner*—John P. Sheehan

*Attorney, Agent, or Firm*—Antonelli, Terry & Wands

[57] ABSTRACT

A ferromagnetic amorphous alloy having a composition represented by $(Co_xNi_yFe_z)_aM_bG_c$, wherein M is Cr, Mo and/or W, G is Zr, Hf and/or Ti and x,y,z and a, b, c are selected to meet the conditions of $x=1-y-z$, $0\leqq y\leqq 0.2$, $0\leqq z\leqq 0.7$, $a=1-b-c$, $0\leqq b\leqq 0.05$ and $0.05\leqq c\leqq 0.2$ This amorphous alloy has a superior magnetic characteristic and a high thermal stability.

9 Claims, 3 Drawing Sheets

FERROMAGNETIC AMORPHOUS ALLOY

Matter enclosed in heavy brackets [ ] appears in the original patent but forms no part of this reissue specification; matter printed in italics indicates the additions made by reissue.

BACKGROUND OF THE INVENTION

The present invention relates to a ferromagnetic amorphous alloy for use as material for magnetic appliances such as magnetic head, transformer, magnetic shield and so forth and, more particularly, to a ferromagnetic alloy of metal-metal amorphous alloy system having a superior thermal stability, high saturation flux density and substantially zero magnetic striction, usable in place of conventional ferromagnetic alloy of metal-metalloid amorphous alloy system.

It is known that, in some kinds of metal or alloy, it is possible to obtain an amorphous structure in which orderly arrangement of atoms is lost so far as a long range of atom arrangement is concerned, by cooling the metal or alloy in a molten state at a high cooling rate of about $10^{6}$° C./s under a specific condition. In recent years, it has been made clear that, among the amorphous alloys produced in the above-explained method, some alloys exhibit superior characteristics which could never be attained by the conventional crystalline alloys, such as high strength, high ductility, and superior soft magnetic characteristics, i.e. high saturation flux density and high magnetic permeability. These alloys are of metal-metalloid amorphous alloy system. A typical example of such alloys is an alloy of Fe-Co-Si-B system. For instance, an alloy having a composition of $Fe_{4.5}Co_{70.5}Si_{15}B_{10}$ and an alloy having a composition of $Fe_{4.8}Co_{75.2}B_{20}$ exhibit saturation flux densities which are as high as 8 to 11 kG. Since in the composition in which the ratio of Co to Fe contents is maintained 94:6, the magnetic striction becomes substantially zero, alloys having such composition can be used as the material of magnetic head, with the advantage that the change of magnetic permeability in the head production process is small. These amorphous alloys, however, are thermally unstable and time dependence is apt to occur regarding the magnetic characteristics thereof, because they are in pseudo-equilibrium state. Such thermal unstability is caused particularly in the amorphous alloys having non-metallic content such as B, C, P and Si. Such thermal unstable characteristic is considered to be caused by the diffusion and segregation of the non-metallic elements. In addition, since the non-metallic elements have no magnetic moment, the amorphous alloy containing non-metallic elements exhibits saturation flux density lower than that of the amorphous alloy consisting of only magnetic metallic elements.

Thus, there has been a demand for improvement in the thermal stability and saturation flux density of the metal-metalloid amorphous alloy.

Japanese Patent Laid-open No. 29817/1979 can be picked up as a reference showing a prior art relevant to the invention of this application.

SUMMARY OF THE INVENTION

Under these circumstance, the present invention aims at providing an amorphous alloy containing a ferromagnetic metal such as Co, Ni, Fe as the major constituent and at least one metal element selected from the group of Ti, Zr, and Hf as a glass former element, in place of conventional non-metallic glass former elements such as B, C, P or Si.

More specifically, the invention provides a ferromagnetic amorphous alloy having a superior soft magnetic characteristic, which alloy is made of an alloy system constituted by a major constituent of Co and a glass former element of Zr and containing, as occasion demands, Ni for reducing the magnetic striction substantially to zero and/or Fe for improving the saturation flux density and/or at least one element of VI group such as Cr, Mo, W for increasing the hardness and crystallization temperature to thereby further improve the thermal stability. A part or whole of Zr may be substituted by Hf or Ti.

The ferromagnetic amorphous alloy of the invention can be expressed by a formula of $(Co_xNi_yFe_z)_aM_bG_c$, wherein M is at least one transition element selected from a group consisting of Cr, Mo and W, G being at least one element selected from a group consisting of Zr, Hf and Ti. In the formula, x, y, z and a, b, c are selected to meet the following conditions:

$$x=1-y-z,\ 0\leqq y\leqq 0.2,\ 0\leqq z\leqq 0.7$$

$$a=1-b-c,\ 0\leqq b\leqq 0.05 \text{ and}$$

$$0.05\leqq c\leqq 0.2.$$

The saturation flux density may be lowered below 10 KG, when the value of y exceeds 0.2 or when the value of b exceeds 0.05. Also, the saturation flux density is rapidly lowered as the value of Z exceeds 0.7. The amorphous structure can hardly be obtained when the value of c representing the amount of Zr, Hf and/or Ti is less than 0.05. A value of c in excess of 0.2 causes a drastic reduction of saturation flux density and makes it extremely difficult to obtain the amorphous structure.

The alloy of the invention is preferentially amorphous and the diffraction pattern obtained through known X-ray diffraction technique does not show sharp peak peculiar to crystals.

Any one of known production methods for producing an amorphous alloy, such as single roller quenching method, twin roller quenching method, rotating drum quenching method and spattering method can be used for the production of the amorphous alloy of the invention. The production can be made in any desired atmosphere such as inert gas atmosphere, vacuum or atmospheric air.

The ferromagnetic amorphous alloy of the invention thus constituted exhibits superior characteristics such as crystallization temperature in excess of 450° C. and saturation flux density in excess of 10 KG. It is also possible to obtain an alloy having a magnetic striction falling between $+5\times10^{-6}$ and $-5\times10^{-6}$ (for instance, in a case of such constituents as G is Zr, z and b nearly equal zero and c nearly equals 0.1) and even another alloy having a magnetic striction of substantially zero (for instance, in a case of such constituents as G is Zr, z and b nearly equal zero and y and c nearly equal 0.1).

The valves of y, z and b may be zero. Namely, the addition of Ni, Ne, Cr, Mo and W is optional. It is, however, preferred to select these values as follows when the above-mentioned effect is necessary, that is, the addition of these elements provides the aforementioned advantages:

$0<y\leqq 0.2$, $0<z\leqq 0.7$ and/or $0<b\leqq 0.05$
(namely, $y+z+b>0$)

In this case, the consumption of precious Co is reduced so that reduction of production cost is achieved as an additional advantage.

The use of Cr and Zr as M and G, respectively, is considered to be appropriate because they can be obtained comparatively easily at relatively low cost.

DESCRIPTION OF THE PRESENTLY PREFERRED EMBODIMENTS

[[] <Example 1[]]>

Among various methods of producing amorphous alloy heretofore known, a single roller quenching method is a representative production method suitable for mass-production. A matrix alloy having a composition expressed by a general formula of $(Co_xNi_yFe_z)_aM_bZr_c$, wherein M is at least one element selected from the VI group elements consisting of Cr, Mo and W ($x=1-y-z$, $0\leqq y\leqq 0.2$, $0\leqq z\leqq 0.7$, $a=1-b-c$, $0\leqq b\leqq 0.05$ and $0.05\leqq c\leqq 0.2$) was prepared and was then subjected to a single roller quenching process conducted in an atmosphere of argon. As a result, ferromagnetic amorphous alloys having superior thermal stability and a high saturation flux density were obtained. In some of these alloys the magnetic striction thereof becomes zero.

The production of these amorphous alloys is possible under any atmosphere other than argon gas atmosphere, e.g. vacuum or atmospheric air, and through any one of various methods such as twin roller quenching process, rotating drum quenching process, spattering process and so on.

In this example, a nozzle of 0.8 mm dia. was used for ejecting a melt. The samples were produced using a copper roll of 400 mm dia. rotated at a speed of 1500 r.p.m. and at a melt ejecting pressure of 0.05 to 0.3 $Kg/cm^2$.

Figure 1:
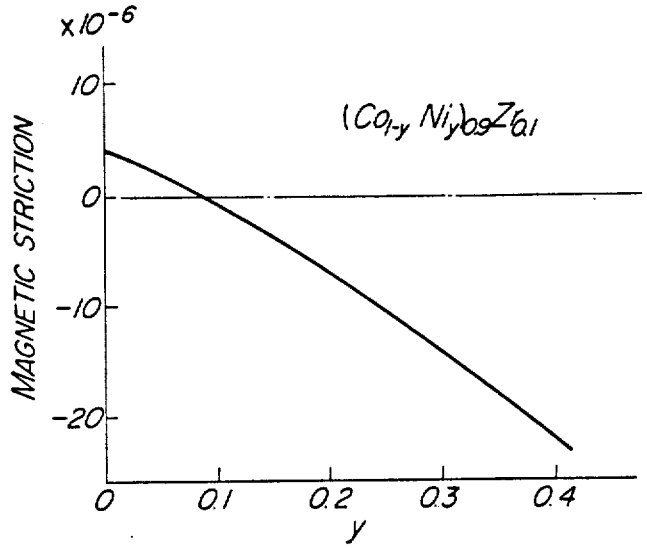
FIG. 1 is a diagram showing a Y-dependency of magnetic striction in an amorphous alloy expressed by $(Co_{1.0-y}Ni_y)_{0.9}Zr_{0.1}$.

FIG. 1 shows the value of magnetic striction of amorphous alloys of composition expressed by $(Co_{1-y}Ni_y)_{0.9}Zr0.1$ with the value of y being varied between 0 and 0.4, under application of a magnetic field of 120 Oe, as a function of y. As will be seen from FIG. 1, the magnetic striction takes a value of between $+5\times10^{-6}$ and $-5\times10^{-6}$ when the value of y is between 0 and 0.2. The saturation flux density of amorphous alloy having a composition of $Co_{0.8}Ni_{0.1}Zr_{0.1}$ is 11.3 KG which is equivalent to or higher than that of conventional amorphous alloys of Fe-Co-B system and Fe-Co-Si system heretofore reported.

The saturation flux density is linearly increased as Ni is decreased. An alloy expressed by $Co_{0.9}Zr_{0.1}$ showed a saturation flux density which is as high as 12.4 KG. Thus, the amorphous alloy of $(Co_{1-y}Ni_y)_{0.9}Zr_{0.1}$ exhibits a saturation flux density of 10 KG or more and a magnetic striction falling between $+5\times10^{-6}$ and $-5\times10^{-6}$ when the value y falls between 0 and 0.2. The crystallization temperature of this alloy was observed to be between about 450° C. and about 500° C. Substantially zero magnetic striction was obtained with an alloy having a composition of $(Co_{0.9}Ni_{0.1})_{0.9}Zr_{0.1}$ i.e. $x\approx0.9$, $y\approx0.1$, $z=0$, $a\approx0.9$, $b=o$ and $c\approx0.1$.

[[] <EXAMPLE 2[]]>

Figure 2:
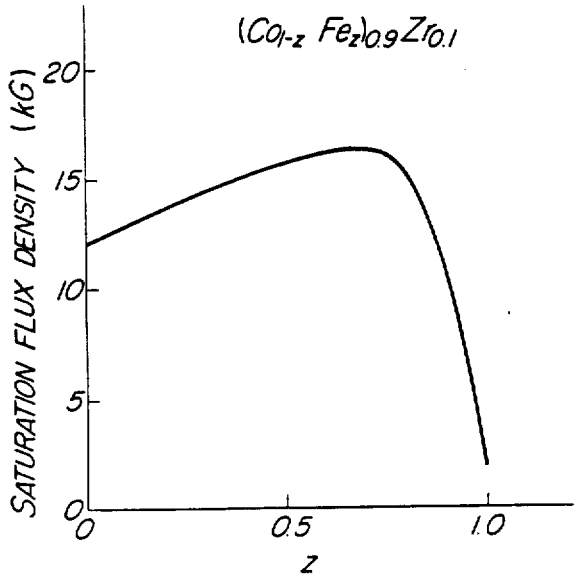
FIG. 2 is a diagram showing z-dependency of saturation flux density in al alloy expressed by $(Co_{1-z}Fe_z)_{0.9}Zr_{0.1}$.

FIG. 2 shows how much the saturation flux density is varied by addition of Fe to the alloy of $Co_{0.9}Zr_{0.1}$. The conditions of production of samples are identical to those of Example 1. It will be seen that in $(Co_{1-z}Fe_z)_{0.9}Zr_{0.1}$ alloy system, the saturation flux density is increased in accordance with the increase of Fe and that a high saturation flux density in excess of 12 KG is obtainable in the region of $Z\leqq0.7$.

It will be also seen from FIG. 2 that the saturation flux density is rapidly lowered as the value Z is increased beyond 0.7.

Figure 3:
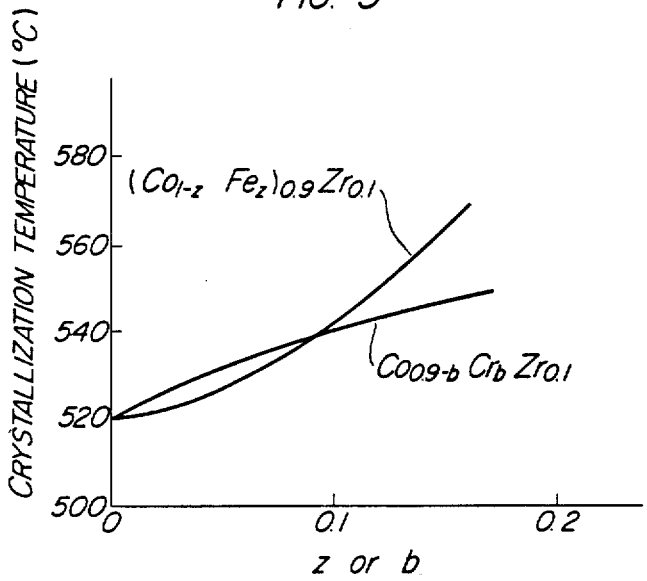
FIG. 3 is a digram showing z-dependency and b-dependency of crystallization temperature of alloys expressed by $(Co_{1-z}Fe_z)_{0.9}Zr_{0.1}$ and $Co_{0.9-b}Cr_bZr_{0.1}$.

The relationship between the crystallization temperature and the amount z or Fe is shown at FIG. 3, as well as the relationship between the crystallization temperature and the amount b of Cr. As will be clearly understood from FIG. 3, in the alloy of the invention, the crystallization temperature is raised in accordance with the increase of the amount z of Fe, and the thermal stability is enhanced correspondingly.

[[] <EXAMPLE 3[]]>

In this case, an amorphous alloy expressed by $(Co_{1-y}Ni_y)_{0.9-b}Cr_bZr_{0.1}$ where $0\leqq y\leqq0.2$ and $0\leqq b\leqq0.05$ was produced in the same manner as Example 1, and coercive force, saturation flux density, crystallization temperature and bending characteristic after annealing were measured.

The coercive force is monotonously decreased by addition of Cr element to the $(Co_{1-y}Ni_y)_{0.9}Zr_{0.1}$ alloy. For instance, the $Co_{0.86}Cr_{0.04}Zr_{0.1}$ alloy exhibits a coercive force which is as small as about 0.1 Oe or less, even in the sample as it is produced. The same result is obtained in the case in which Ni is added. However, since the saturation flux density is decreased as the amount of addition of Cr increases, the amount b of addition of Cr must be maintained 0.05 or less if saturation flux density of 10 KG or higher is to be obtained.

The alloy of the invention exhibits a crystallization temperature of 450° C. or higher and, hence, there is obtained a high thermal stability. Particularly, the addition of Fe, Cr, Mo and/or W raises the crystallization temperature.

FIG. 3 shows, by way of example, how much the crystallization temperature Tx is changed in accordance with the change of z and b in the aforementioned $(Co_{1-z}Fe_z)_{0.9}Zr_{0.1}$ system and $Co_{0.9-b}Cr_bZr_{0.1}$ system alloys. It will be understood that the crystallization temperature is raised in accordance with the increase of z and b. The curves shown in FIG. 3 are plotted even in a range where b is greater than 0.05.

In order to investigate the embrittlement caused by annealing, an annealing was conducted at 440° C. in 30 minutes with respect to $Co_{0.9-w}Cr_wZr_{0.1}$ ($0.02 \leqq W \leqq 0.05$) alloy having a thickness of about 20 μm, with the result that there is obtained. Superior thermal stability in such a degree as the 180° bending thereof is possible even after the annealing. Such a high thermal stability could never be attained by conventional metal-metalloid amorphous alloys. Thus, it was confirmed that the amorphous alloy of the invention exhibits a high thermal stability.

Although the foregoing description is made on an assumption that Cr is used, substantially equivalent advantage were confirmed with the use of Mo or W in place of Cr. Substantially same result was also obtained when two or more of elements Cr, Mo and W are used.

[[] <EXAMPLE 4[]]>

Figure 4:
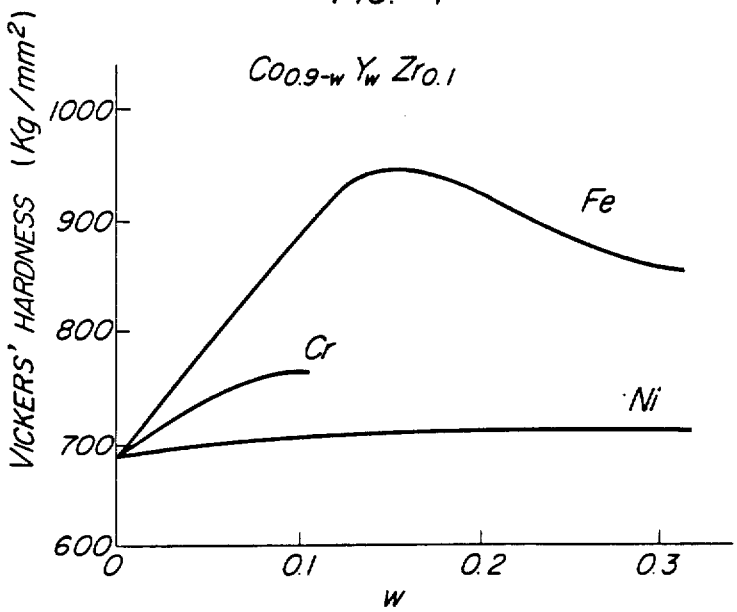
FIG. 4 is a diagram showing how much the hardness is affected in $Co_{0.9-w}Y_wZr_{0.1}$ system by an additional element Y which is Fe, Cr or Ni.

FIG. 4 shows how much the hardness of $Co_{0.9-w}Y_wZr_{0.1}$ alloy (Y=Fe, Ni, Cr) is changed in accordance with the variation in the amounts of elements added. The sample was produced in the same manner as Example 1. In FIG. 4, it is shown that a considerable improvement of hardness is achieved by addition of Fe, Ni and Cr. Equivalent improvement in hardness was obtained when Mo or W, which belongs to VI group in the periodic table as in the case of Cr, is used in place of Cr.

[[] <EXAMPLE 5[]]>

In alloy of the invention, the concentration of Zr is selected to fall between 0.05 and 0.2. This is because the Zr concentration less than 0.05 makes the amorphous structure hardly obtained and because the Zr concentration in excess of 0.2 causes a serious reduction of saturation flux density, as well as difficulty in formation of amorphous structure.

In the composition of the alloy of invention, a part or whole of Zr can be substituted by Ti or Hf. For example, it was observed that the alloys having compositions of $Co_{0.913}Hf_{0.087}$ and $Co_{0.909}Zr_{0.048}Hf_{0.043}$ compositions had amorphous structure. These amorphous alloys also showed high crystallization temperatures exceeding 500° C. Equivalent effect was obtained with alloys of structures in which Hf is substituted by Ti, e.g. $Co_{0.907}Ti_{0.093}$ and $Co_{0.911}Zr_{0.043}Ti_{0.046}$ as well as in the case of alloys in which both of Hr and Ti are added, e.g. $Co_{0.909}Hf_{0.047}Ti_{0.044}$.

[[] <EXAMPLE 6[]]>

Alloys having compositions of $(Co_{0.72}Ni_{0.156}Fe_{0.024}Zr_{0.1})_{95}Mo_5$, $(Co_{0.72}Ni_{0.156}Fe_{0.024}Zr_{0.1})_{95}W_5$, $(Co_{0.72}Ni_{0.156}Fe_{0.024}Zr_{0.1})_{95}Cr_5$, $Co_{72}Ni_{15.6}Fe_{2.4}Zr_{10}$ were produced in the same manner as Example 1 and were subjected to an X-ray diffraction. As a result, it was confirmed that all of these alloys have amorphous structures. The saturation magnetizations were 90, 77, 83 and 112 emu/g, respectively, while the crystallization temperatures were 485° C., 498° C., 490° C. and 482° C., respectively.

[[] <EXAMPLE 7[]]>

Figure 5:
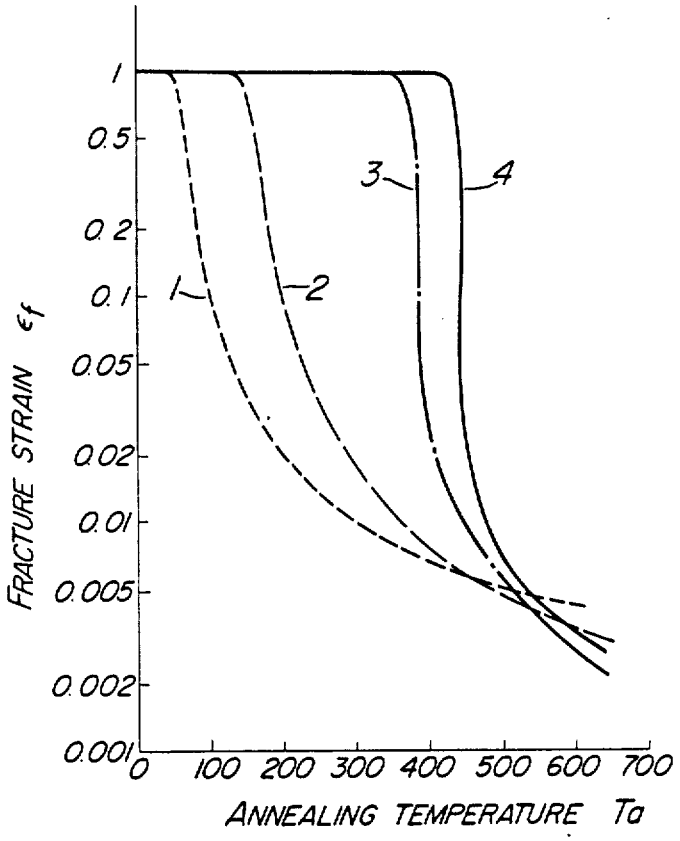
FIG. 5 is a graph showing the relationship between the annealing temperature and fracture strain as observed in an amorphous alloy embodying the present invention and a conventional amorphous alloy.

Amorphous alloys of the present invention having compositions of $(Co_{0.9}Ni_{0.1})_{90}Zr_{10}$ and $(Fe_{0.7}Co_{0.3})_{90}Zr_{10}$ were prepared together with conventional amorphous alloys of $Fe_{40}Ni_{40}P_{14}B_6$ and $Fe_{40}Co_{40}B_{20}$ as references. These alloys were subjected to a bending test after annealing at 100° C. to 600° C. in 30 minutes. As a result, relationships between the bending fracture strain and annealing temperature as shown in FIG. 5 was observed. In FIG. 5, axis of abscissa and axis of ordinate represent, respectively, annealing temperature and fracture strain $E_f$. The thickness of the samples was about 20 μm. Characteristics of amorphous alloys $Fe_{40}Ni_{40}P_{14}B_6$, $Fe_{40}Co_{40}B_{20}$, $(Fe_{0.7}Co_{0.3})_{90}Zr_{10}$ and $(Co_{0.9}Ni_{0.1})_{90}Zr_{10}$ are denoted by numerals 1, 2, 3 and 4, respectively.

From FIG. 5, it is shown that the amorphous alloy of the invention has a higher embrittlement commencing temperature and, hence, a higher thermal stability than the conventional amorphous alloy having non-metallic content.

As has been described, the amorphous alloy of the invention has superior magnetic and mechanical characteristics, as well as high thermal stability.

Obviously, many modifications and variations of the invention are possible in the light of the above teachings. It is therefore to be understood that within the scope of the appended claims the invention may be practiced otherwise than as specifically described.

What is claimed is:

1. A ferromagnetic amorphous alloy having a composition expressed by $(Co_xNi_yFe_z)_aM_bG_c$, wherein M is at least one transition metal element selected from the group consisting of Cr, Mo and W, G is [at least one element selected from the group consisting of Zr] Hf [and Ti] and wherein x, y, z and a, b, c are selected to meet the conditions of: $x=1-y-z$, $0 \leqq y \leqq 0.2$, $0 \leqq z \leqq 0.7$, $a=1-c$, $0 \leqq b \leqq 0.05$ and $0.05 \leqq c \leqq 0.2$.

2. A ferromagnetic amorphous alloy as claimed in claim 1, wherein y, z and b meet the condition of $y+z+b>0$.

3. A ferromagnetic amorphous alloy as claimed in claim 1, wherein y meets the condition of $0<y \leqq 0.2$.

4. A ferromagnetic amorphous alloy as claimed in claim 1, wherein z meets the condition of $0<z \leqq 0.7$.

5. A ferromagnetic amorphous alloy as claimed in claim 1, wherein b meets the condition of $0<b>0.05$.

6. A ferromagnetic amorphous alloy as claimed in claim 1, wherein y and bent the conditions of $0<y \leqq 0.2$, $0<z \leqq 0.7$ and $0<b<0.05$.

7. A ferromagnetic amorphous alloy as claimed in claim 1, wherein Z, b and c meet the conditions of $z \approx 0$, $b \approx 0$ and $c \approx 0.1$.

8. A ferromagnetic amorphous alloy as claimed in claim 7, wherein y meets the condition of $y \approx 0.1$.

9. A ferromagnetic amorphous alloy as claimed in claim 1, 2, 3, 4, 5, 6, 7 or 8, wherein the element represented by M is Cr.

[10. A ferromagnetic amorphous alloy as claimed in claim 1, 2, 3, 4, 5, 6, 7 or 8, wherein the element represented by G is Zr.]

[11. A ferromagnetic amorphous alloy as claimed in claim 1, 2, 3, 4, 5, 6, 7 or 8, wherein elements represented by M and G are Cr and Zr, respectively.]

* * * * *